Dec. 5, 1967  H. P. BIRMINGHAM  3,355,941
COLLIMATED AIRCRAFT LANDING ASSIST SYSTEM
Filed Oct. 31, 1963
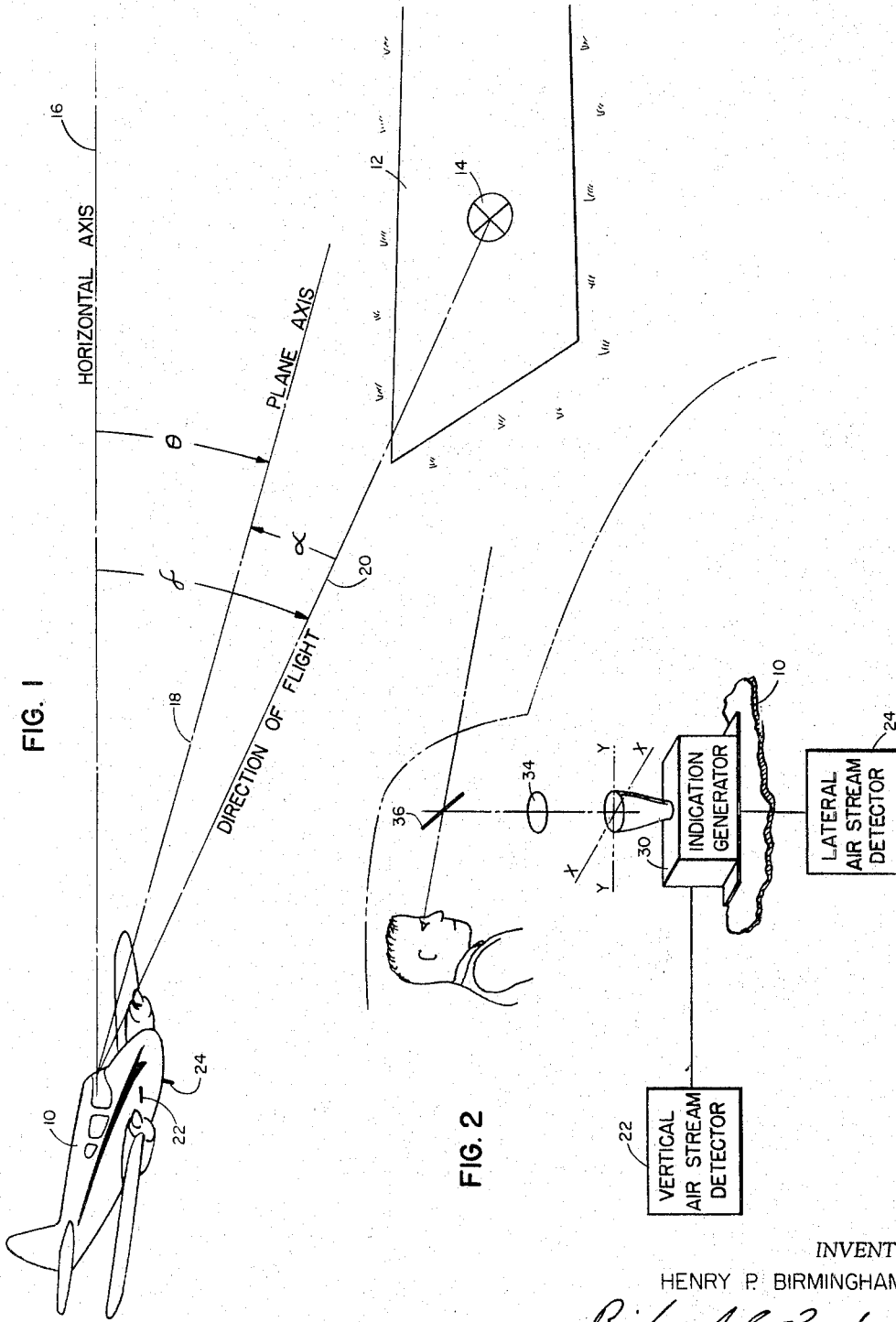
INVENTOR
HENRY P. BIRMINGHAM
BY
ATTORNEYS

United States Patent Office 3,355,941
Patented Dec. 5, 1967

3,355,941
COLLIMATED AIRCRAFT LANDING
ASSIST SYSTEM
Henry P. Birmingham, Washington, D.C., assignor to the United States of America as represented by the Secretary of the Navy
Filed Oct. 31, 1963, Ser. No. 320,582
8 Claims. (Cl. 73—178)

ABSTRACT OF THE DISCLOSURE

A method and appartus for visually representing the instantaneous direction of flight of an aircraft to the pilot so that the visual indication of the direction of flight can be superimposed on the aircraft's destination by the pilot to aid him in navigation toward or landing of the aircraft at the destination.

---

The invention described herein may be manufactured and used by or for the Government of the United States of America for governmental purposes without the payment of any royalties thereon or therefor.

This invention relates to aircraft navigation aids and more particularly to a system for projecting the instantaneous flight path of the aircraft on the real world as an aid to pilots in either the navigation or landing of an aircraft.

Numerous systems have been proposed and employed for assisting pilots in the navigation and landing of aircraft. These systems vary widely in complexity of operation, degree of reliability and practicality of employment and utilize radio beams, light beams, reflectors, simulators in the form of airborne computers and a multiplicity of other related complex directional indicators. Many of these systems operate on the principle of providing the pilot with an indication of his deviation from a prescribed flight path but do not necessarily tell him what that desired flight path is.

The navigation and landing aid system of the present invention simply and accurately indicates to the pilot the actual direction of aircraft flight at all times rather than merely the deviations from a prescribed flight path. This is accomplished in the present invention by employing a pair of airstream detectors mounted at right angles to each other the outputs of which position a dynamic light source. Light from the light source is passed through a collimating lens and combining glass to provide an apparent image at the pilot's eye level on the external scene at the point on the external scene toward which the aircraft is actually moving. A further attribute of the present invention not common to the prior art systems is the absence of a need for any ground or aircraft carrier based equipment, when used under VFR operating conditions, to provide information to the aircraft upon which the directional computations are made.

It is an object of the present invention to provide a projected image along the instantaneous flight path of the aircraft through the air mass.

Another object of the present invention is the provision of a system which will be accurate regardless of maneuvers by the aircraft such as climbs, dives, banks, turns and sideslips.

Yet another object of the present invention is to provide a simple, accurate system for assisting aircraft pilots in maintaining straight line flight toward a selected point within his view.

A further object of the present invention is the provision of an aircraft landing assist system which indicates to the pilot the direction of his plane travel at all times with respect to the landing surface and surrounding area by projecting an apparent image along the flight path which appears superimposed on the landing surface.

These and other objects along with many of the attendant advantages of the present invention will be readily appreciated and better understood when the following detailed description is considered in conjunction with the accompanying drawings wherein:

FIG. 1 is a diagrammatic view displaying the geometric relationships embodied in the present invention; and FIG. 2 is a schematic view displaying the relationship of the electronic and optical equipment of the present invention.

Referring now in detail to the drawings wherein like reference characters represent like parts throughout the several views, there is shown in FIG. 1 an aircraft generally designated 10 and an aircraft carrier deck or landing strip 12 having a marking 14 on the runway thereof located at the optimum point of "touchdown" for a landing.

The navigational and landing assist system of the present invention is based on the theory of air mass coordinates and involves a horizontal axis through the aircraft, designated 16, which is parallel to the earth's surface, the plane or aircraft axis, designated 18, which represents the longitudinal center line of the aircraft and the direction of flight, designated 20, which represents the actual direction of motion of the aircraft through the air mass. The angle between the horizontal axis and the direction of flight is designated $\gamma$ and defines the flight path, the angle between the direction of flight and the axis of the aircraft is designated $\alpha$ and represents the angle of attack, while the angle between the horizontal axis and the axis of the aircraft, designated $\theta$ represents the pitch of the aircraft. It will be readily apparent from the foregoing that in all instances $\gamma=\theta-\alpha$ and this relationship of space coordinates provides the basic concept upon which this system is based.

The sensors and electronic equipment (FIG. 2) provide a signal projection of $\gamma$ which is the result of $\alpha$ being sensed by airstream detectors and subtracted from $\theta$ which is provided by the fact that the optical system is fixed in relationship to the aircraft axis. Thus the equation $\gamma=\theta-\alpha$ is continually and instantaneously being satisfied.

Referring now to FIG. 2, there is shown the novel beam generating and projecting system of the present invention which includes a vertical airstream detector 22 which generates an electrical signal proportional to the magnitude of the vertical component of the airstream traversing the aircraft and a lateral airstream detector 24 for sensing any lateral component of the airstream traversing the aircraft which might be produced by a side slip or skid. Detector 24 also provides an electrical signal proportional to the sensed lateral airstream component. The airstream detectors may be of the type known commercially as a type S3 Angle of Attack system manufactured by Specialties, Inc., although any airstream sensor providing an equally instantaneous, proportional electrical output would be sufficient. The electrical signals provided by vertical airstream detector 22 and lateral airstream detector 24 are transmitted to indication generator 30 which is fixed to the air frame 10. The indication generator 30 may be any of a number of variably positionable light sources but is preferably a cathode ray tube producing an image that is variably positionable simultaneously in two coordinates.

Any signal transmitted by the vertical airstream detector 22 will move the light source or image vertically from the center and any signal produced by the lateral airstream detector will move the light source or image laterally or horizontally. These movements are accomplished simultaneously and the actual movement of the image is along a line on the face of the tube defined by the vertical and horizontal components sensed. This light source or image is preferably in the form of a dot which under influence from the vertical airstream detector 22 or lateral airstream detector 24 will transmit a light through collimating lens 34 onto combining glass 36 which will provide a projected image in the pilot's field of view along the axis of the aircraft.

Any vertical component of air flow sensed by the vertical airstream detector due to the actual direction of flight of the aircraft being above or below the plane's axis will cause the image or dot on the indication generator to move along the Y—Y axis thus providing $\alpha$ to the system. The angle $\theta$ computation is provided by the fact that the indication generator, collimating lens, and combining glass are fixed with relationship to the aircraft axis and not gyroscopically mounted. Thus the equation $\gamma = \theta - \alpha$ is satisfied in that the projected dot is positioned such that its displacement from the horizontal (actual) subtends an angle at the pilot's eye equal to $\gamma$ and the dot is projected by optical equipment along the true flight path of the aircraft.

Any lateral component of the airstream caused by a sideslip or skid will be detected by the lateral airstream detector 24 which will provide a signal to the indication generator proportional to the side-slip angle to laterally move the image or light source along the X—X axis so that the dot will appear along the true flight path with respect to any crabbing or other angular positioning of the aircraft laterally. The side-slip angle is that angle in the plane which is lateral with respect to the aircraft which is defined by the axis of the aircraft and the direction of flight of the aircraft.

In operation, when it is desired to use the system of the present invention as a navigational aid, the pilot merely checks the compass heading to insure that he is flying his desired course, places the image which is projected in his field of view on some identifiable landmark on the horizon and by continuing to maintain the projected image on this landmark will fly on a course to said landmark. If it is desired to intercept another moving object in the air the projected image can similarly be placed and maintained on that object and the aircraft will continually be maintained on a pursuit course toward that object. When the system of the present invention is employed as a landing aid the pilot merely places the projected image on a spot 14 on the runway and by maintaining the image on the spot will fly directly to that spot.

As can be seen from the foregoing the present invention provides a comparatively simple and accurate navigational and landing approach aid which permits the pilot at all times to view the landing area or external scene which he is approaching without having to frequently refer to his instruments. Hence he may direct his attention to the rapidly approaching land mass or carrier, as the case may be, and to observe, continuously the actual direction of movement of his aircraft in both the lateral and longitudinal coordinates.

Obviously many modifications and variations are possible in light of the foregoing teachings. It is to be understood, therefore, that this invention is to be limited only by the appended claims and not otherwise.

What is claimed is:

1. A flight path projection system for aiding a pilot in visually navigating or landing an aircraft comprising first means for sensing the angle of attack of said aircraft and transmitting a first electrical signal proportional thereto,
second means mounted at right angles to said first means for sensing the side-slip angle of said aircraft and transmitting a second electrical signal proportional thereto, and
optical means mounted in a fixed relationship to said aircraft and responsive to said first and second electrical signals for projecting an apparent image along the instantaneous flight path of said aircraft at optical infinity.

2. The method of indicating the instantaneous flight path of an aircraft to the pilot comprising the steps of:
sensing the angle of attack of said aircraft,
generating an electrical signal proportional to said angle of attack,
sensing the side-slip angle of said aircraft,
generating an electrical signal proportional to said side-slip angle, and
projecting an image at optical infinity along the instantaneous flight path of said aircraft in response to said generated signals.

3. A flight path projection system for aiding a pilot in visually navigating or landing an aircraft, comprising:
a first airstream detector for sensing the angle of attack of said aircraft and transmitting a first electrical signal proportional thereto,
a second airstream detector mounted at right angles to said first airstream detector for sensing the side-slip angle of said aircraft and transmitting a second electrical signal proportional thereto, and
an optical image projecting system including an image producing means mounted in a fixed relationship to the longitudinal axis of said aircraft and responsive to said first and second electrical signals for projecting said image along the instantaneous flight path of said aircraft at optical infinity.

4. A method for aiding a pilot in visually landing an aircraft comprising the steps of;
sensing the angle of attack of said aircraft,
generating an electrical signal proportional to said angle of attack,
sensing the side-slip angle of said aircraft,
generating an electrical signal proportional to said side-slip angle,
projecting an image at optical infinity along the instantaneous flight path of said aircraft in response to said generated signals,
aligning said projected image with a predetermined destination, and
maintaining said projected image in alignment with said destination throughout the approach to said destination.

5. A flight path projection system for aiding a pilot in visually navigating or landing an aircraft, comprising:
a first air stream detector for sensing the angle of attack of said aircraft and transmitting a first electrical signal proportional thereto,
a second airstream detector mounted at right angles to said first airstream detector for sensing the side-slip angle of said aircraft and transmitting a second electrical signal proportional thereto,
an indication generator for generating an image thereon electrically connected to said first and second airstream detectors, said indication generator generating said image at a location on said generator defined by the electrical signals transmitted by said detectors, and
optical means geometrically associated with said indication generator for projecting said image in the pilot's field of view on the external environment, said projected image representing the instantaneous flight path of said aircraft.

6. A flight path projection system according to claim 5 wherein the indication generator is a cathode ray tube.

7. A flight path projection system according to claim 5 wherein the indication generator's position is geometrically fixed with respect to the longitudinal axis of said aircraft.

8. A method for continually projecting the instantaneous flight path of an aircraft in the pilot's field of view comprising the steps of:

continually projecting an apparent image along the longitudinal axis of the aircraft onto the external environment of the aircraft and simultaneously offsetting said apparent image in proportion to the angle of attack and the side-slip angle of said aircraft whereby said projected image defines the instantaneous flight path of said aircraft.

References Cited

UNITED STATES PATENTS

| | | | |
|---|---|---|---|
| 2,426,184 | 8/1947 | Deloraine et al. | 340—27 |
| 2,830,291 | 4/1958 | Hecht et al. | 73—178 |
| 2,871,699 | 2/1959 | Kenyon | 73—180 |
| 3,005,185 | 10/1961 | Cumming et al. | 340—27 |
| 2,887,927 | 5/1959 | Newton | 33—46.5 |

LOUIS R. PRINCE, *Primary Examiner.*

NEIL SIEGEL, *Assistant Examiner.*